US012627024B2

(12) United States Patent
Cogoni

(10) Patent No.: US 12,627,024 B2
(45) Date of Patent: May 12, 2026

(54) ANTENNA PACKAGE

(71) Applicant: STMicroelectronics (Alps) SAS, Grenoble (FR)

(72) Inventor: Deborah Cogoni, Notre Dame de l'Osier (FR)

(73) Assignee: STMicroelectronics (Alps) SAS, Grenoble (FR)

( * ) Notice: Subject to any disclaimer, the term of this patent is extended or adjusted under 35 U.S.C. 154(b) by 189 days.

(21) Appl. No.: 18/545,106

(22) Filed: Dec. 19, 2023

(65) Prior Publication Data

US 2024/0120638 A1 Apr. 11, 2024

Related U.S. Application Data

(63) Continuation of application No. 17/408,982, filed on Aug. 23, 2021, now Pat. No. 11,888,208.

(30) Foreign Application Priority Data

Aug. 25, 2020 (FR) ....................................... 2008676

(51) Int. Cl.
*H01Q 1/12* (2006.01)
*H01Q 1/38* (2006.01)

(52) U.S. Cl.
CPC ................. *H01Q 1/12* (2013.01); *H01Q 1/38* (2013.01)

(58) Field of Classification Search
CPC .......... H01Q 1/12; H01Q 1/38; H01Q 1/2283; H01Q 9/0414
See application file for complete search history.

(56) References Cited

U.S. PATENT DOCUMENTS

| | | | | |
|---|---|---|---|---|
| 11,888,208 | B2 * | 1/2024 | Cogoni | H01Q 9/0414 |
| 2018/0323502 | A1 | 11/2018 | Lee | |
| 2019/0173184 | A1 | 6/2019 | Kim et al. | |
| 2019/0334231 | A1 | 10/2019 | Sakurai | |
| 2020/0127366 | A1 | 4/2020 | Liao et al. | |
| 2021/0020560 | A1 | 1/2021 | Wang et al. | |

FOREIGN PATENT DOCUMENTS

| | | | |
|---|---|---|---|
| EP | 3663983 | A1 | 6/2020 |
| JP | 2007088882 | A | 4/2007 |

OTHER PUBLICATIONS

INPI Search Report and Written Opinion for FR Appl. No. 2008676 dated May 6, 2021 (11 pages).

* cited by examiner

*Primary Examiner* — David E Lotter
(74) *Attorney, Agent, or Firm* — Crowe & Dunlevy LLC

(57) ABSTRACT

An electronic device includes a first layer with an antenna and a second metal layer that extends over the entire first layer. The second metal layer includes at least one laterally-closed cavity that is located vertically above the antenna. The cavity is filled, at least in part, by a resin material. A first plate supporting a second metal plate extends over the cavity with the second metal plate positioned vertically above the antenna. The first metal plate may be supported by a ledge within the cavity. Alternatively, the second metal plate is embedded in the resin filling the cavity, with the second metal plate positioned vertically above the antenna.

18 Claims, 9 Drawing Sheets

ANTENNA PACKAGE

CROSS REFERENCE TO RELATED APPLICATIONS

This application is a continuation of U.S. patent application Ser. No. 17/408,982, filed Aug. 23, 2021, which claims the priority benefit of French Application for Patent No. 2008676, filed on Aug. 25, 2020, the contents of which are hereby incorporated by reference in their entireties to the maximum extent allowable by law.

TECHNICAL FIELD

The present disclosure generally concerns electronic devices and, more particularly, devices comprising an antenna located in a package and methods of manufacturing the same.

BACKGROUND

An antenna is an element enabling to radiate (emitter) or to capture (receiver) electromagnetic waves. The antenna is an essential element in a radioelectric system.

There is a need in the art to address disadvantages of known antenna devices.

SUMMARY

An embodiment provides an electronic device comprises: a first layer comprising an antenna; a second metal layer extending over the entire first layer and comprising at least one laterally-closed cavity, said cavity being located opposite the antenna; a first plate extending opposite the cavity; and a second metal plate, resting on the first plate, located opposite the antenna.

Another embodiment provides a method of manufacturing an electronic device comprising: forming a first layer comprising an antenna; forming a second metal layer extending over the entire first layer and comprising at least one laterally-closed cavity, said cavity being located opposite the antenna; laying a first plate extending opposite the cavity on the second layer; and laying a second metal plate, resting on the first plate, located opposite the antenna.

According to an embodiment, the first plate is made of glass.

According to an embodiment, the first plate entirely covers the second layer and the cavity.

According to an embodiment, the cavity is filled with resin.

According to an embodiment, the lateral walls of the first plate are coplanar with the lateral walls of the second layer.

According to an embodiment, the lateral walls of the first layer are coplanar with the lateral walls of the second layer.

According to an embodiment, the cavity comprises an edge having the first plate resting thereon.

According to an embodiment, the portion of the cavity under the level of the edge is filled with resin.

According to an embodiment, the method comprises placing the second plate on the edge.

According to an embodiment, the method comprises bonding the second layer to the first layer.

According to an embodiment, the method comprises bonding the second plate to the upper surface of the first plate before laying the first plate.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the applications of the described embodiments and the uses of the antenna are not described.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms “front”, “back”, “top”, “bottom”, “left”, “right”, etc., or to relative positional qualifiers, such as the terms “above”, “below”, “upper”, “lower”, etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1A:
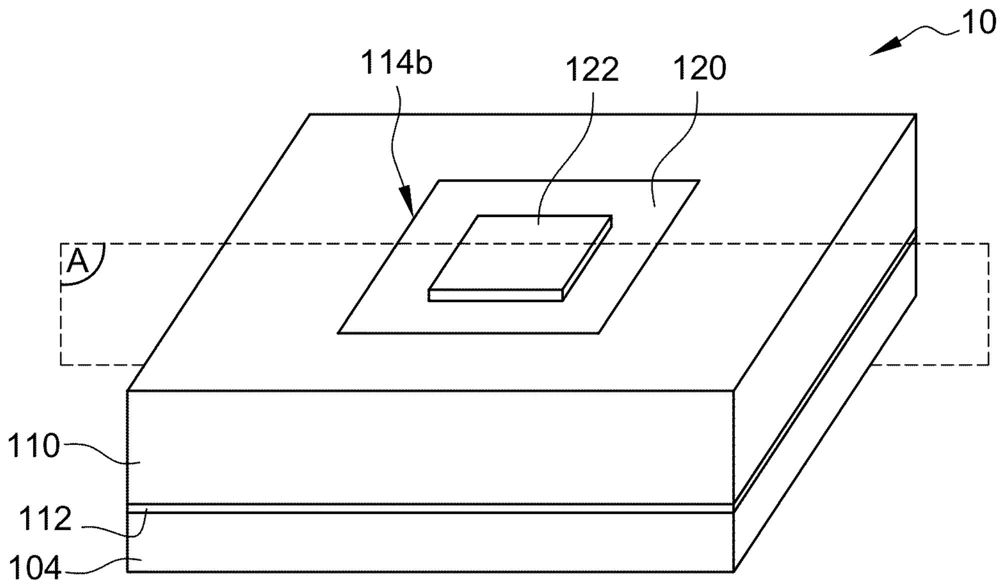
FIG. 1A is a perspective view of an embodiment of an antenna device.
Figure 1B:
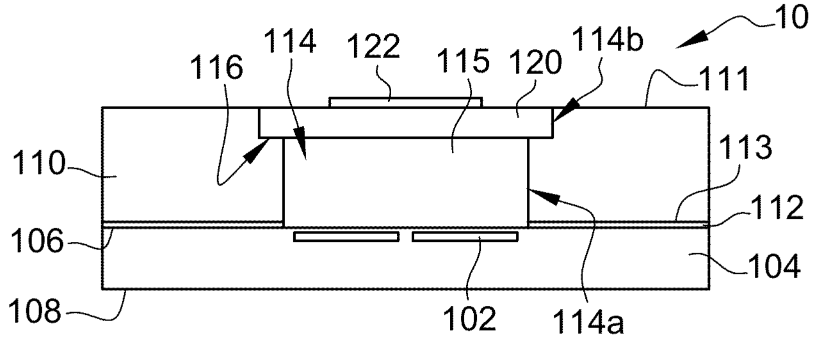
FIG. 1B is a cross-section view of the embodiment of FIG. 1A.

FIG. 1A is a perspective view of an embodiment of an antenna device 10, more particularly of an "Antenna in Package" or AiP. FIG. 1B is a cross-section view along plane A of the embodiment of FIG. 1A.

Device 10 comprises an antenna 102, preferably buried in a layer 104. Although FIGS. 1A and 1B show a single antenna in layer 104, a plurality of antennas 102 may be buried in layer 104, at different locations.

Layer 104 preferably is a semiconductor substrate. Layer 104 comprises a first surface 106, or upper surface, and a second surface 108, or lower surface. Preferably, surface 106 is a planar surface. Preferably, surface 108 is a planar surface. Preferably, surface 108 is parallel to surface 106.

Antenna 102 is preferably buried in substrate 104. For example, the antenna is closer to surface 106 than to surface 108. The antenna is, for example, surrounded with the material of substrate 104. Preferably, antenna 102 does not protrude from substrate 104. Preferably, antenna 102 is not exposed.

Substrate 104, for example, comprises electronic components, not shown. The electronic components are, for example, located in substrate 104. Electronic components may, for example, be formed on surface 108. Preferably, no component is formed on surface 106. Preferably, there is no component protruding from substrate 104 at the level of surface 106.

Substrate 104, for example, comprises electric connection elements, not shown. Connection elements, for example, enable to connect antenna 102 to the components located in substrate 104 or to external elements by surface 108. Connection elements, for example, enable to connect antenna 102 to one or a plurality of circuits and/or one or a plurality of chips, not shown, located on the side of surface 108. For example, chips may be bonded to the surface 108 of layer 104 and be electrically coupled to antenna 102 by connection pads located on surface 108. For example, a chip configured to generate signals to be emitted by antenna 102 or to process signals received by antenna 102 may thus be bonded to surface 108.

Device 10 comprises a metal layer 110. Layer 110 preferably is made of an alloy based on aluminum and/or based on copper. Preferably, layer 110 is made of a single material. Layer 110 comprises a first surface 111, or upper surface, and a second surface 113, or lower surface. Lower surface 113 is preferably planar. Upper surface 111 is preferably planar. Upper surface 111 is preferably parallel to lower surface 113. Layer 110 is located on the side of surface 106 of substrate 104. Layer 110 is bonded to the surface 106 of layer 104 by surface 113. For example, layer 110 is bonded to the surface 106 of layer 104 by a bonding layer 112, for example, a glue layer. The glue layer is, for example, made of an electrically-insulating material.

Layer 110 comprises a cavity 114. Cavity 114 is located vertically above, or vertically in front of, antenna 102. The cavity thoroughly crosses layer 110. Preferably, cavity 114 is vertically in line with the entire antenna. For example, no portion of the antenna is located vertically below layer 110.

For example, layer 110 comprises a single cavity 114. For example, layer 110 entirely covers layer 104 except for the portion vertically above cavity 114.

Cavity 114 is a laterally closed cavity. In other words, cavity 114 is entirely laterally surrounded by layer 110. More particularly, the bottom of the cavity is formed by the upper surface 106 of substrate 104 and the lateral walls of the cavity are formed by layer 110. Cavity 114 is entirely laterally surrounded by layer 110. Cavity 114 thus only comprises an opening at the level of the upper surface of layer 110, that is, the surface opposite to the surface 113 bonded to the surface 106 of substrate 104.

Layer 110 comprises an edge 116 in cavity 114. Edge 116 preferably extends over the entire contour of cavity 114.

Cavity 114 is thus divided into first and second portions 114*a* and 114*b*. The cavity is thus formed of the first and second portions 114*a* and 114*b*. The first portion 114*a* is the lower portion, that is, the portion closest to surface 106 of the substrate, in other words, the closest to the bottom of the cavity. Portion 114*a* extends from the bottom of the cavity to edge 116.

First portion 114*a* is filled with a region 115 made of a material allowing the forming of an electromagnetic field in portion 114*a*. The material filling region 114*a* is an encapsulation material, preferably resin, more preferably basic epoxy resin, for example, a resin of "Glob Top" or "Molding" type.

Second portion 114*b* extends from edge 116 to the upper surface 111 of layer 110. At least one horizontal dimension of the first portion, that is, one of the dimensions in the plane of the upper surface of layer 110, is greater than the dimension in the same direction of the first portion.

A plate 120 is located in portion 114*b*. Plate 120 rests on edges 116 (which form, in practice, a ledge for supporting the plate 120). Plate 120 is maintained in place by edges 116 and the lateral walls of portion 114*b*. The edge enables to avoid vertical motions of plate 120. The lateral walls enable to avoid motions in a horizontal direction. Plate 120 rests on resin 115 filling portion 114*a*. Plate 120 is, for example, bonded to the edges 116 by a bonding layer, not shown.

The dimensions of plate 120 are substantially equal to the dimensions of portion 114*b*. The dimensions of plate 120 are such that it is possible to place the plate in portion 114*b* in such a way that it does not significantly displace during the use of the device. The horizontal dimensions of plate 120 are greater than the horizontal dimensions of portion 114*a* of cavity 114. Preferably, the thickness of plate 120 is substantially equal to the thickness of portion 114*b*. Thus, the upper surface of plate 120, that is, the surface most remote from substrate 104, is coplanar with the upper surface of layer 110.

Plate 120 is made of a solid material, enabling to transmit the electromagnetic field. Preferably, plate 120 is made of glass. For example, plate 120 is made of a dielectric material.

Device 10 further comprises a plate 122 located vertically above antenna 102. Plate 122 is located on plate 120. Plate 122 rests on the upper surface of plate 120, that is, the surface most distant from substrate 104, in other words the surface opposite to the surface of plate 110 resting on edge 116. Plate 122 at least partially covers plate 120. Plate 122 is bonded to plate 120, for example, by a bonding layer, for example, a glue layer, not shown. Preferably, the bonding layer is a layer configured to give way to an electromagnetic field.

As a variant, plate 122 may be located under plate 120. In other words, plate 122 may be located between the surface of plate 120 resting on edges 116 and region 115. Plate 122 would then be protected by plate 120.

As a variant, plate 120 may comprise a non-through cavity vertically above the antenna, said cavity being filled with plate 122.

Plate 122 is configured to channel the electromagnetic field generated by antenna 102 in cavity 114. Plate 122 is preferably made of a conductive material, preferably made of a metal, for example, of copper, or aluminum, or of an alloy of copper and of aluminum.

More generally, layer 110 comprises a cavity 114, a plate 120, and a plate 122 vertically above each antenna buried in substrate 104. Further, layer 110 may, for example, comprise laterally-closed cavities which are not located vertically above antennas 102. Said closed cavities are then filled with the same material as cavities 114, for example, with resin. Preferably, all the cavities in layer 110 are filled with resin.

As a variant, layer 110 may also comprise laterally-closed cavities, closed at the level of upper surface 111 by a portion of layer 110. Once layer 110 has been placed on layer 104, it is no longer possible to access the inside of said cavity from surface 111.

Layer 110 entirely covers layer 104 except for closed cavities. In other words, the lateral surfaces, that is, the surfaces coupling the upper and lower surfaces of layer 110 are substantially coplanar with the lateral surfaces of layer 104, that is, the surfaces coupling surfaces 106 and 108. Preferably, the lateral surfaces of layers 104 and 110 are substantially orthogonal to the upper and lower surfaces of layers 104 and 110.

As a variant, edge 116 may extend over a different number of sides of the cavity, as long as the edge enables to support plate 120. The edge, for example, extends on two opposite sides of cavity 114. The other sides comprising no edge.

FIGS. 2A to 2E illustrates steps of manufacturing of the embodiment of FIGS. 1A and 1B. FIGS. 1A and 1B illustrate the manufacturing of a single antenna 102 and of a corresponding single cavity 114. However, the manufacturing method may be performed to simultaneously form a plurality of antennas and a plurality of cavities 114 on a same layer 104.

Figure 2A:
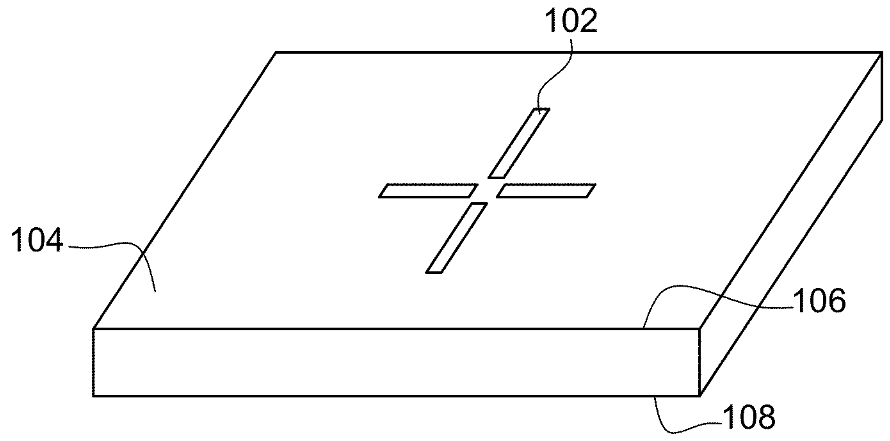
FIG. 2A is a perspective view illustrating a step of manufacturing of the embodiment of FIGS. 1A and 1B.
Figure 2B:
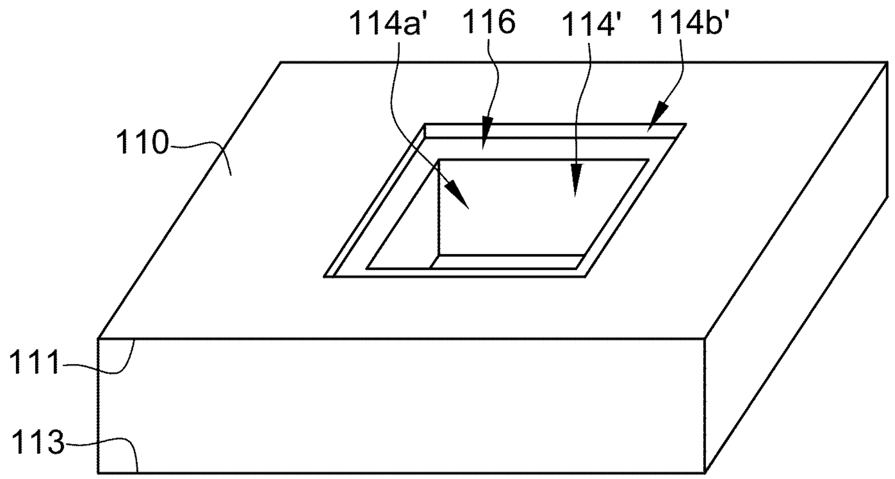
FIG. 2B is a perspective view illustrating another step of manufacturing of the embodiment of FIGS. 1A and 1B.

FIG. 2A is a perspective view illustrating a step of manufacturing of the embodiment of FIGS. 1A and 1B. FIG. 2B is a perspective view illustrating a step of manufacturing of the embodiment of FIGS. 1A and 1B. The steps corresponding to FIGS. 2A and 2B are independent steps and may be carried out successively or in parallel.

During the step of FIG. 2A, antenna 102 is formed in substrate 104. Other components, not shown, may be formed in the substrate and/or on surface 108 of the substrate. Connection elements, not shown, may also be formed in substrate 104 or on surface 108.

During the step of FIG. 2B, layer 110 is formed. Layer 110 is preferably formed by machining. Layer 110 is formed to have horizontal dimensions substantially equal to the dimensions of layer 104. Layer 110 is preferably formed from a continuous solid layer, where the previously-described cavities are formed.

Layer 110 comprises an opening 114', located at the location of the cavity 114 of FIGS. 1A and 1B. Opening 114' crosses layer 110. The opening thus extends from the first surface 111 of layer 110 to the second surface 113 of layer 110. Opening 114' has the shape of cavity 114, that is, it comprises the previously-described edge 116. In the example of FIG. 2B, the edge surrounds opening 114'. Layer 110 is continuous except for opening 114'.

Opening 114' comprises, like the cavity 114 of FIGS. 1A and 1B, a first portion **114*a*' and a second portion 114*b*' respectively corresponding to the portions 114*a* and 114*b* of the cavity 114 of FIGS. 1A and 1B. First portion 114*a*' is thus the lower portion, that is, the portion which is closest to surface 113. Portion 114*a*' extends from surface 113 to edge 116**.

Second portion **114*b*' extends from edge 116 to the upper surface 111 of layer 110. At least one horizontal dimension of second portion 114*b*', that is, one of the dimensions in the plane of the upper surface of layer 110, is greater than the dimension in the same direction of first portion 114*a*'**.

Figure 2C:
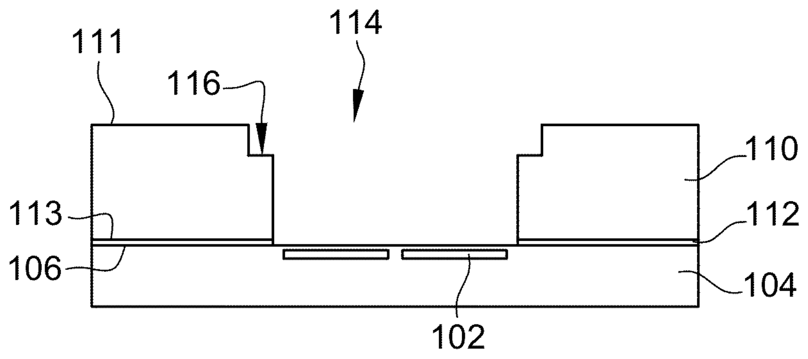
FIG. 2C is a cross-section view illustrating another step of manufacturing of the embodiment of FIGS. 1A and 1B.
Figure 2D:
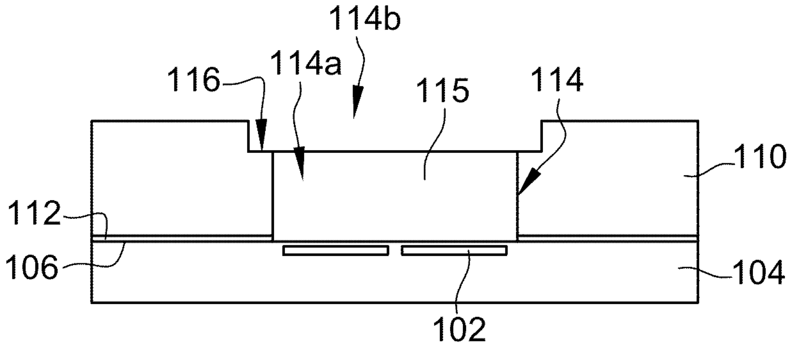
FIG. 2D is a cross-section view illustrating another step of manufacturing of the embodiment of FIGS. 1A and 1B.
Figure 2E:
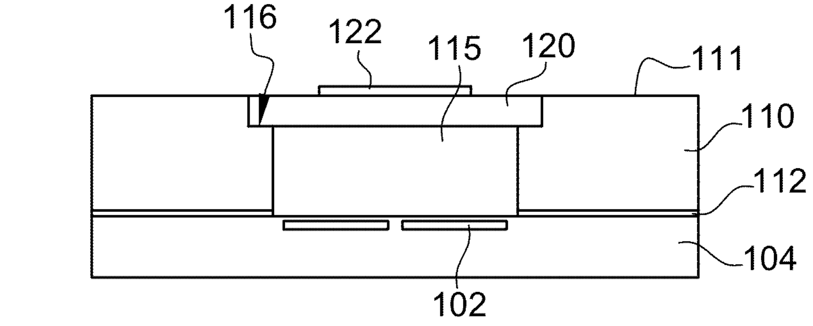
FIG. 2E is a cross-section view illustrating another step of manufacturing of the embodiment of FIGS. 1A and 1B.

FIGS. 2C, 2D, and 2E are cross-section views along plane A of FIG. 1A, that is, in the plane of FIG. 1B, illustrating manufacturing steps. The steps corresponding to FIGS. 2C, 2D, and 2E are preferably successive and subsequent to the steps of FIGS. 2A and 2B.

FIG. 2C is a cross-section view illustrating a step of manufacturing of the embodiment of FIGS. 1A and 1B.

During this step, layer 110 is bonded to substrate 104. More particularly, layer 110 is bonded to surface 106 of layer 104. More particularly, surface 113 of layer 110 is bonded to surface 106 of layer 104.

This step, for example, comprises the deposition of bonding layer 112, for example, a glue layer, on substrate 104 at the locations where layer 110 will be present. Thus, bonding layer 112 extends on regions of the surface 106 of layer 104 which are not located vertically above opening 114'. Layer 112 is preferably not present vertically above antenna 102.

This step further comprises depositing layer 110 on layer 112 to bond layer 110 to layer 104. Cavities 114 are thus formed by lateral walls formed by layer 110 and a bottom formed by the surface 106 of layer 104.

Layer 110 is located on layer 104 so that the lateral surfaces of layer 110 are substantially coplanar to the lateral surfaces of layer 104.

In the example of FIG. 2C, the only portion of surface 106 to be exposed is the portion located at the bottom of cavity 114. More generally, all the exposed portions of surface 106 are located in closed cavities, that is, cavities comprising lateral walls formed by layer 110 entirely surrounding the cavity.

FIG. 2D is a cross-section view illustrating a step of manufacturing of the embodiment of FIGS. 1A and 1B.

During this step, cavity 114 is filled by region 115. The material of region 115 is an encapsulation material, preferably resin, more preferably basic epoxy resin, for example, a resin of "Glob Top" or "Molding" type. For example, the material of region 115 is deposited by a syringe. The material of region 115 is for example deposited in all the cavities of layer 110, in particular in all the cavities crossing layer 110. Thus, all the exposed portions of surface 106 are covered with the material of region 115.

The quantity of material placed in cavity 114 is preferably such that the first portion **114*a* of the cavity is entirely filled. The material placed in cavity 114 does not protrude from the level of edge 116. Thus, the material of region 115 is preferably not placed in second portion 114*b*. Preferably, region 115 extends from the upper surface of layer 104 to the level of edge 116**.

The height of region 115 is selected according to the characteristics of the electromagnetic field which is desired to be formed by the antenna, in region 115.

FIG. 2E is a cross-section view illustrating a step of manufacturing of the embodiment of FIGS. 1A and 1B.

During this step, plates 120 and 122 are placed on the structure. More particularly, plate 120 is placed in the second portion **114*b* of the cavity. Plate 120 rests on edge 116. Preferably, plate 120 rests on the upper surface of region 115. Plate 120 is thus wedged in the second portion 114*b*** of the cavity.

Plate 122 is located on plate 120, vertically above the antenna. Plate 122 is for example bonded to plate 120 by a bonding layer, for example, a glue layer. Plate 122 is for example formed on plate 120 by metal deposition.

As a variant, a non-through cavity may be formed in plate 120. Plate 122 is then formed or located in the cavity.

As a variant, plate 122 may be located on the side of plate 120 at closest to region 115. In other words, plate 122 may be located between region 115 and plate 120.

According to an embodiment, plate 122 is bonded to plate 120 before step 2E. Thus, plate 120 is placed in portion 114*b* after the bonding of plate 122. Plate 122 is bonded to the surface of plate 120 opposite to the surface resting on the edge. Plate 122 is relatively accurately placed to ensure that plate 122 is located vertically above the antenna. The material of plate 120 is selected to be solid and not to deform during the transport, to avoid alignment issues, for example, to ensure that plate 122 stays in the location vertically above the antenna.

In this embodiment, the number of individual plates 122, that is, comprising a single plate 122, formed is equal to the number of cavities.

As a variant, plate 122 may be bonded to plate 120 after the placing of plate 120 in portion 114*b*.

Figure 3A:
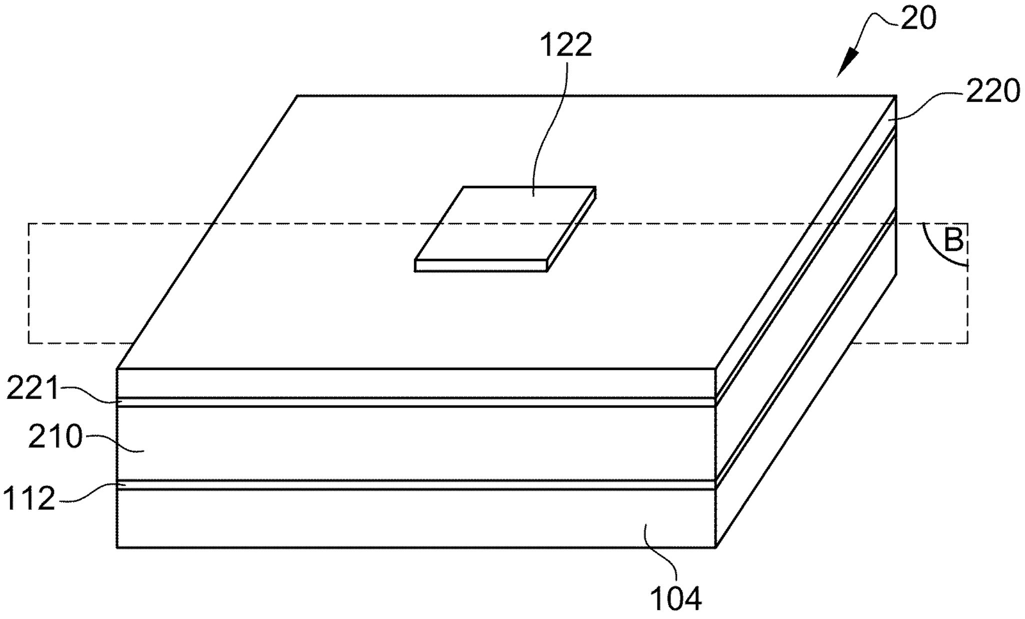
FIG. 3A is a perspective view of another embodiment of an antenna device.
Figure 3B:
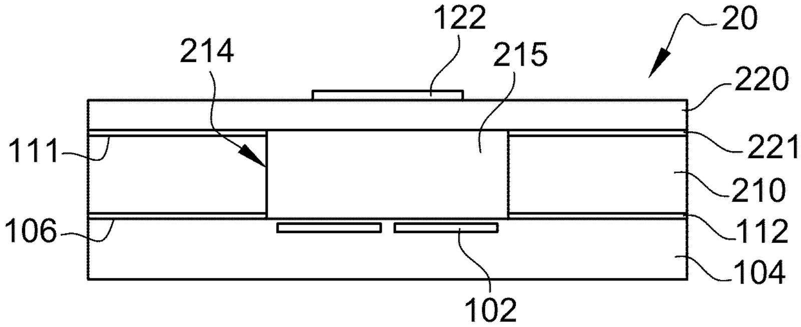
FIG. 3B is a cross-section view of the embodiment of FIG. 3A.

FIG. 3A is a perspective view of another embodiment of an antenna device 20. FIG. 3B is a cross-section view along plane B of the embodiment of FIG. 3A.

Device 20 comprises elements identical to the elements of the device 10 of FIGS. 1A and 1B. Device 20 comprises layer 104 and antenna 102, such as previously described.

Device 20 further comprises a layer 210, bonded to layer 104 by bonding layer 112. Layer 210 is identical to the layer 110 of FIGS. 1A and 1B except for the fact that layer 210 comprises no edge. Thus, layer 210 comprises a cavity 214 located, like the cavity 114 of device 10, vertically above antenna 102. Cavity 214 differs from cavity 114 in that its walls are preferably planar and orthogonal to the plane of the upper surface 106 of layer 104.

Device 20 comprises a plate 220. Plate 220 is preferably made of a dielectric material, preferably of glass. Plate 220 differs from the plate 120 of device 10 in that plate 220 rests on the upper surface of layer 210, and not on edges. Plate 220 preferably extends on the entire upper surface of layer 210. The lateral surfaces of plate 220 are preferably substantially coplanar with the lateral surfaces of layer 210.

Plate 220 is, for example, bonded to the upper surface of layer 210 by a bonding layer 221, for example, a glue layer.

As a variant, plate 220 may not be bonded to layer 210 by a bonding layer but by blocking elements at the level of the lateral surfaces of plate 220 and of layer 210. Plate 220 then preferably rests on the upper surface of layer 210.

The plate 122 of this drawing is identical to the plate 122 described in relation with FIGS. 1A and 1B. However, since plate 220 preferably covers the entire layer 104, a plurality of plates 122 may be located on plate 220. Thus, in the case where device 20 comprises a plurality of antennas 102, and thus a plurality of cavities 214 and a plurality of plates 122, each plate 122 is located vertically above one of antennas 102 on the same plate 220.

Cavity 214 is filled with a region 215, identical to the region 115 of device 10, except for the fact that region 215 extends all along the height of layer 210. Region 215 preferably extends from the upper surface of layer 104 to the lower surface of plate 220, that is, the surface closest to layer 210. Preferably, the upper surface of region 215 is coplanar with the upper surface of layer 210 or, if a bonding layer 221 is present, with the upper surface of the bonding layer.

Further, although various elements of the described structures, in particular cavities 114, 214, plates 120, 122, 220, layers 110, 104, 210 are shown as having square or rectangular cuboid shapes, it should be understood that these elements may also have different shapes, while keeping a layout such that plate 122 is located vertically above cavity 114 or 214 and antenna 102. In particular, plate 122 may have rounded angles or have a cylindrical shape. Similarly, cavities 114 and 214 may have cylindrical shapes. The various shapes, and in particular the shape of cavities 114, 214, are selected to allow the forming of an electromagnetic field, having the characteristics desired in cavities 114, 214.

Figure 4A:
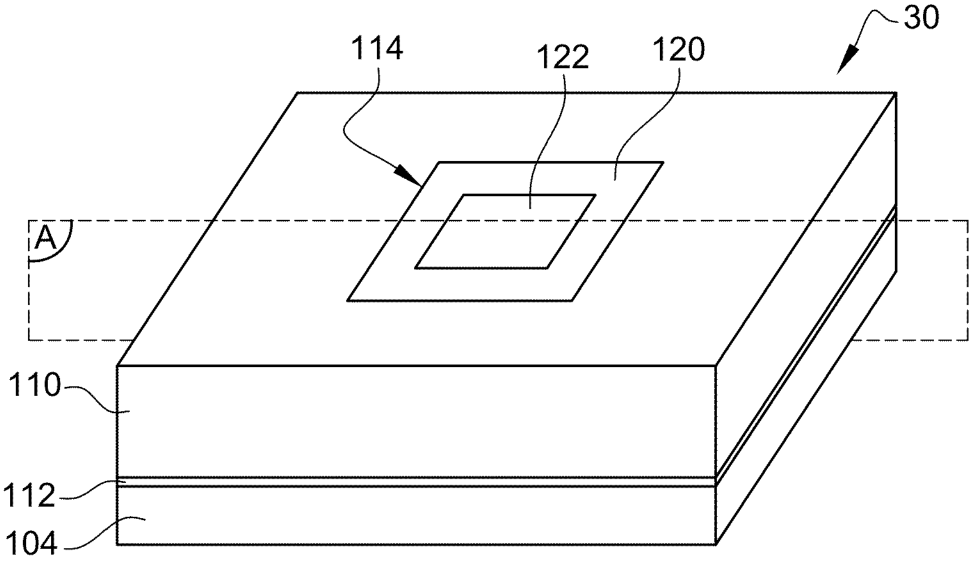
FIG. 4A is a perspective view of another embodiment of an antenna device.
Figure 4B:
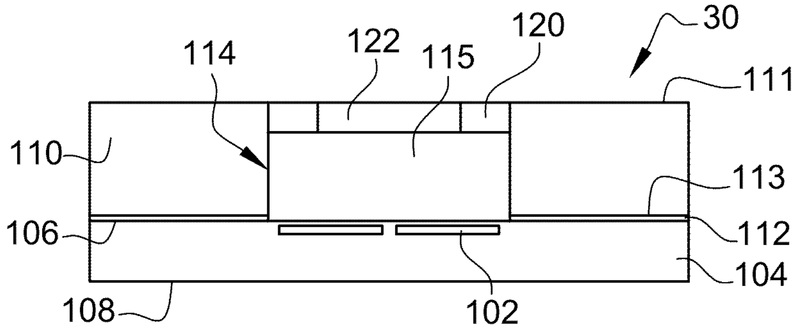
FIG. 4B is a cross-section view of the embodiment of FIG. 4A.

FIG. 4A is a perspective view of another embodiment of an antenna device 30. FIG. 4B is a cross-section view of the embodiment of FIG. 4A.

The device 30 comprises elements of the device 10 of FIGS. 1A and 1B that will not be described again but does not comprise the edge 116. In other words, the device 30 differs from the device 10 of FIG. 1 in that the layer 110 does not comprise the edge 116.

Furthermore, the plate 122 is preferably located in (included in) the plate 120. The plate 122 extends preferably from an upper face to a lower face of the plate 120. The plate 122 is therefore surrounded laterally by the plate 120. The plate 120 may, in this case, be in a resin, or a thermoplastic material, doped with a (non-conductive) metallic inorganic compound activated, preferably adapted to a method of laser direct structuring. In this case, the plate 122 can be a region of the plate 120 activated by laser.

The flanks, or lateral sides, of the cavity 114 are preferably straight. The plate 120 rests, preferably solely, on the resin 115. In other words, the plate 120, located in the cavity 114, does not rest on the layer 110. Plate 120 solely rest on the region 115. The cavity 114 is therefore filled by the resin 115 and the plate 120.

Preferably, the horizontal dimensions of the plate 120 are substantially equal to the horizontal dimensions of the cavity. In other words, the plate 120 preferably covers entirely the resin 115.

Preferably, the height of the stack comprising the resin 115 and the plate 120 is substantially equal to the height of the layer 110. Therefore, the lower surface of the resin is preferably coplanar with the lower surface of the layer 110 and the upper surface of the plate 120 is preferably coplanar with the upper face of the layer 110.

The manufacturing method of the device 30 differs from the method described in relation with FIGS. 2A to 2E in that the form of the layer does not comprise the edge 116.

Figure 5A:
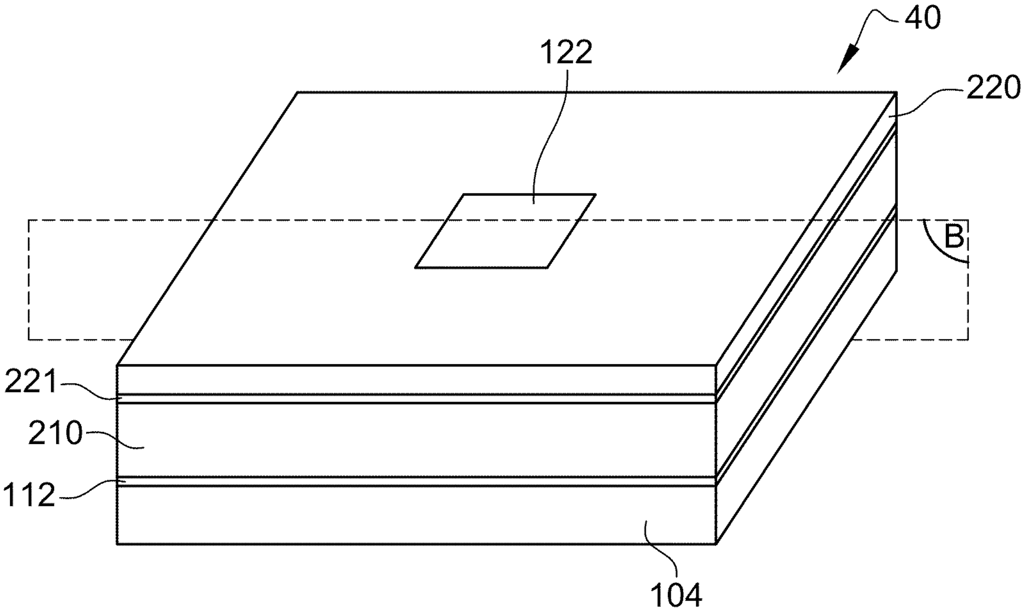
FIG. 5A is a perspective view of another embodiment of an antenna device.
Figure 5B:
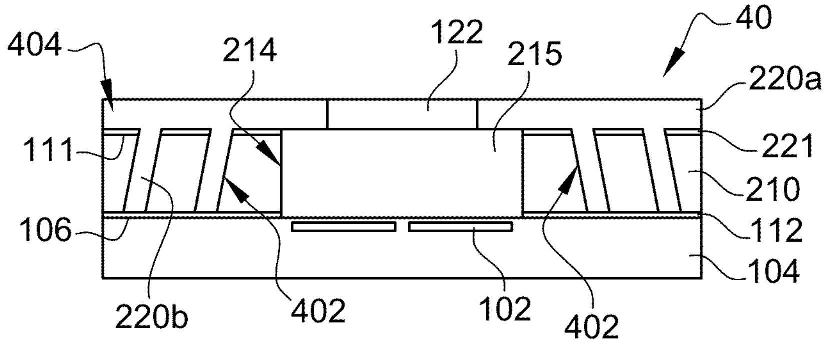
FIG. 5B is a cross-section view of the embodiment of FIG. 5A.
Figure 5C:
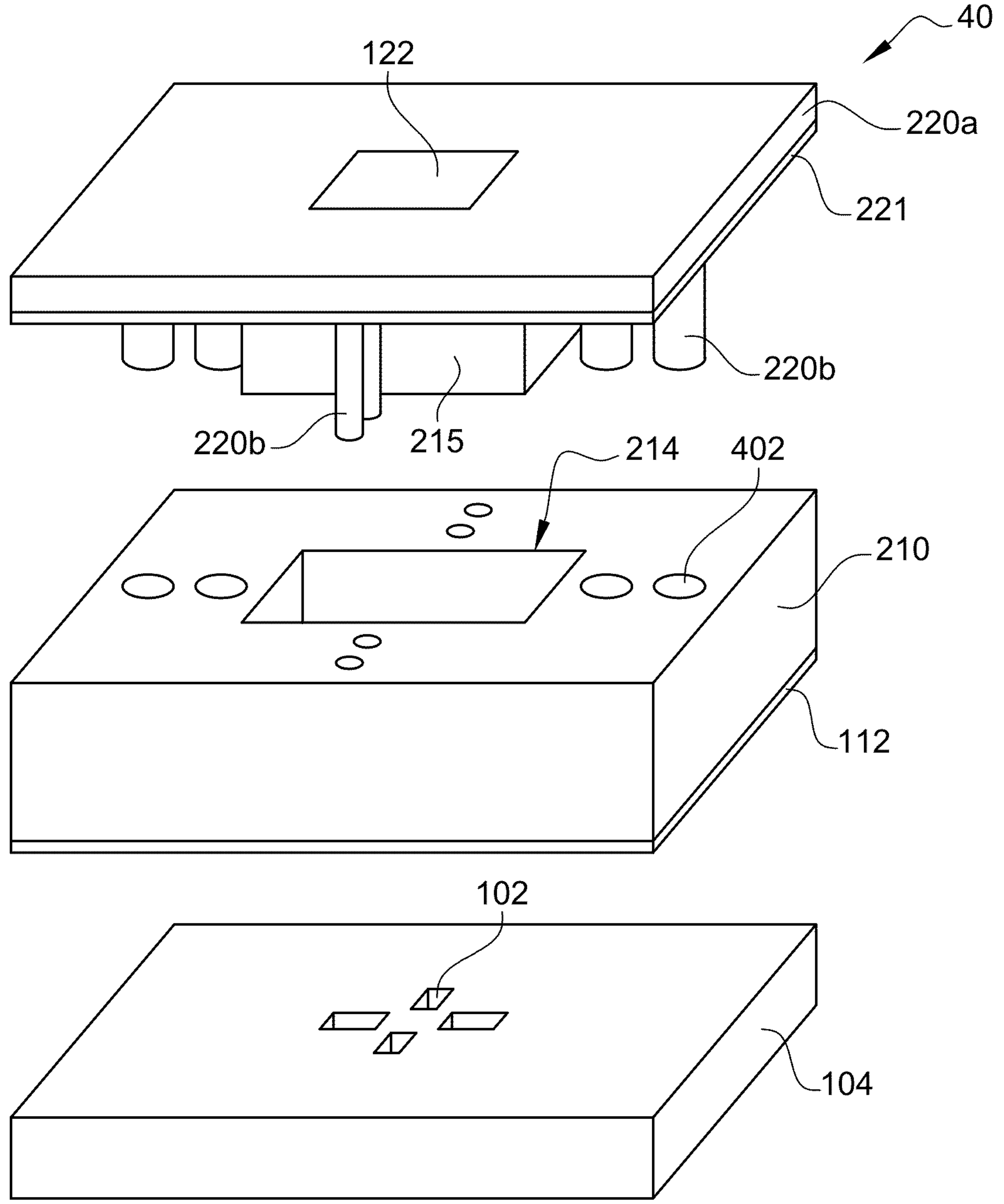
FIG. 5C is an exploded view of the embodiment of FIGS. 5A and 5B.

FIG. 5A is a perspective view of another embodiment of an antenna device 40. FIG. 5B is a cross-section view of the embodiment of FIG. 5A. FIG. 5C is an exploded view of the embodiment of FIGS. 5A and 5B The device 40 comprises elements of the device 20 of FIGS. 3A and 3B that will not be described again. The device 40 differs from the device 20 in that the plate 220 is replaced by an element 404. The element 404 covers the resin 215 and the layer 221 and fills secondary cavities 402 or holes in the layer 210.

In other words, the layer 210 comprises secondary cavities 402. The cavities 402 are open on the upper surface of the layer 210. The cavities extend preferably through the entire height of the layer 210. In other words, the cavities 402 extend preferably from the upper surface of the layer 210 to the lower surface of the layer 210. The cavities 402 also go through the layer 221. Therefore, the cavities 402 extend preferably from the upper surface of the layer 221 to the lower surface of the layer 210. In the example of FIG.

5A, the cavities 402 are inclined in comparison with the lateral surface of the cavity 214. In the example of FIG. 5C, the cavities 402 are vertical, i.e., perpendicular to the surface of layer 210.

The cavities 402 are filled by the element 404. In other words, the element 404 comprises a first part 220*a*, corresponding to the plate 220 of FIGS. 3A and 3B, extending on the upper surface of the layer 221. The plate 220 further comprises parts or feet 220*b* filling, preferably entirely, the cavities 402. The first and second part are preferably in the same material. The first and second parts are preferably made of a single block. The part 220*b* constitutes anchoring parts, configured to lock the element 404 on the layer 210.

In the example of FIG. 5B, the material constituting element 404, for example a resin, is deposited as liquid in order to fill the inclined cavities, or holes, 402 and on top of layer 221 to form the plate 220*a*, and become solid afterwards.

In the example of FIG. 5C, the element 404, for example made of glass, is formed separately and the feet 220*b* are, for example, inserted into the holes 402 to lock the plate 220*a* on the metal plate 210.

The device 40 comprises one or more cavities 402. Preferably, the device 40 comprises at least two cavities 402. For example, each cavity 402 forms a via crossing the layer 210. For example, layer 210 comprises at least one cavity 402, filled by a part 220*b*, on each side of the cavity 214. Alternatively, each cavity 402 forms a ring, or a circle, around the cavity 214.

Furthermore, the plate 122 is preferably located in (i.e., included in) the plate 220. The plate 122 extends preferably from an upper face to a lower face of the plate 220. The plate 122 is therefore surrounded laterally by the plate 220. The plate 220 may, in this case, be in a resin, or a thermoplastic material, doped with a (non-conductive) metallic inorganic compound activated, preferably adapted to a method of laser direct structuring. In this case, the plate 122 can be a region of the plate 220 activated by laser.

The method of manufacturing the embodiment of FIGS. 5A, 5B and 5C further differs from the method of manufacturing the embodiment of FIGS. 3A and 3B in that the step of forming the element 404 comprises the formation of the plate 220 and the filling of the cavities 402.

According to an embodiment, the method of manufacturing the embodiment of FIGS. 5A, 5B and 5C comprises, preferably in this order: the formation the layer 104 and of the antenna 102 located in the layer 104; the formation of the layer 210, including the formation of the cavities 214 and 402; the formation of an ensemble comprising the region 215 and the plate 220, including the part 220*a* and foot 220*b*; the bonding of the layer 210 on the layer 104, for example by the bonding layer 112; and the assembly of said ensemble and the layer 402, the foot 220*b* being placed in the cavities 402 and the region 215 being placed in the region 214, the ensemble for example being bonded to the layer 210 by a bonding layer 221.

The plate 122 is for example placed, or formed by laser direct structuring, during the step of formation of the ensemble. Alternatively, the plate 122 can be formed by laser direct structuring in the part 220*a* after the assembly.

Alternatively, the material of the element 404 is, for example, a dielectric material, for example a resin or a plastic. The material of the element 404 is, for example, adapted to the process of laser direct structuring (LDS), or the process of laser chemical plating. The plate 122 is formed, for example, by the process of laser direct structuring (LDS), from the material of the element 404. In this embodiment, the method of manufacturing comprises. for example, preferably in this order: the formation of the layer 104 and the antenna 102 located in the layer 104; the formation of the layer 210, including the formation of the cavities 214 and 402; the bonding of the layer 210 on the layer 104, for example by the bonding layer 112; and the deposition of the material of the element 404 on the upper face of layer 210, and in the cavities 402 and 214, the cavities being preferably entirely filled with said material, and the upper face of layer 210 being preferably entirely covered in said material; the annealing of the material of the element 404; and the formation of the plate 122 by the process of laser direct structuring.

Figure 6A:
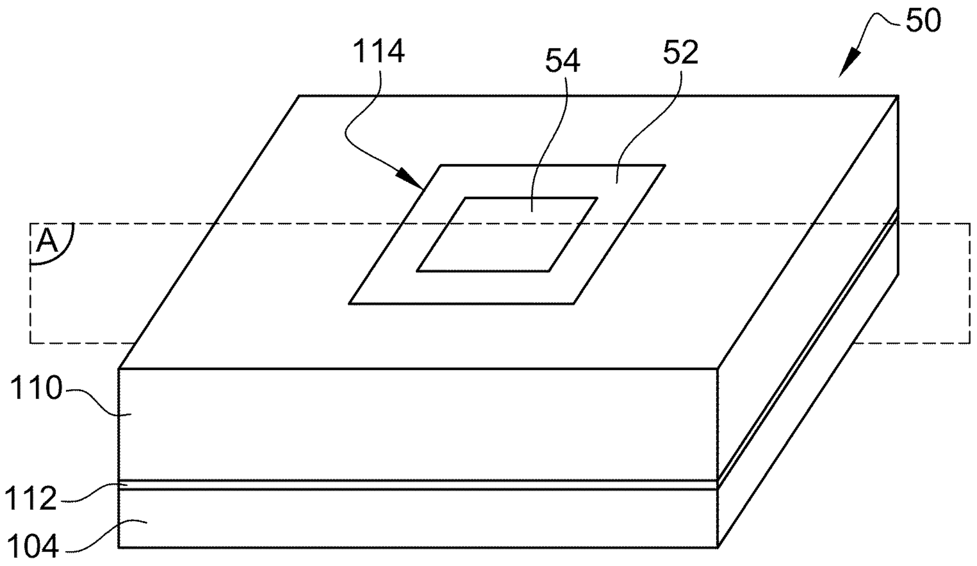
FIG. 6A is a perspective view of another embodiment of an antenna device.
Figure 6B:
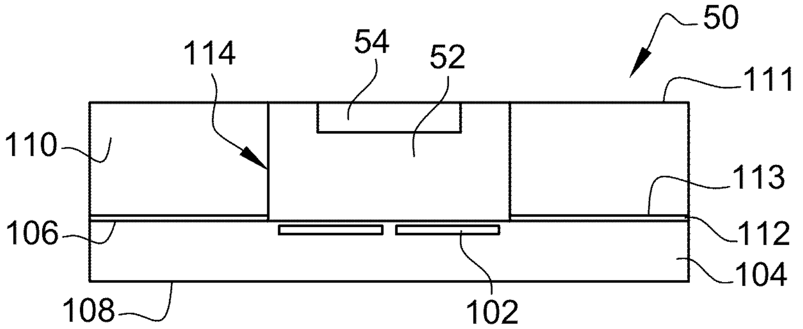
FIG. 6B is a cross-section view of the embodiment of FIG. 6A.

FIG. 6A is a perspective view of another embodiment of an antenna device. FIG. 6B is a cross-section view of the embodiment of FIG. 6A.

The device 50 comprises elements of the device 30 of FIGS. 4A and 4B that will not be described again. The device 50 differs from the device 30 in that the device 50 does not comprise the plate 120.

The device 50 comprises the cavity 114. The cavity 114 preferably has straight flank, in other words, flanks substantially orthogonal to the substrate 104.

The cavity 114 is filled with a material 52. Preferably, the cavity 114 is filled with a single material 52. The material 52 is preferably a dielectric material, for example a resin or a plastic. The material 52 is chosen to allow the forming of an electromagnetic field in cavity 114. The material 52 is adapted to the process of laser direct structuring (LDS), or the process of laser chemical plating. The material preferably extends from the bottom of the cavity 114, in other words the upper face of the substrate 104, to the plane of the upper face of the layer 110.

The plate 122 of FIGS. 4A and 4B is replaced, in the device 50 of FIGS. 6A and 6B, by a plate 54. The plate 54 is part of the antenna of the device 50 and has the same use as the plate 122 of device 30. The plate 54 is located in the cavity 114, in the material 52. The plate 54 is located on the upper side of the material 52, one face of the plate 54 being preferably coplanar with the upper face of the material 52.

The plate 54 is formed by the method of LDS. In other words, the cavity 114 is entirely filled with the material 52, and the plate 54 is formed by application of a laser at the location of the plate 54 followed by a plating process.

Figure 7:
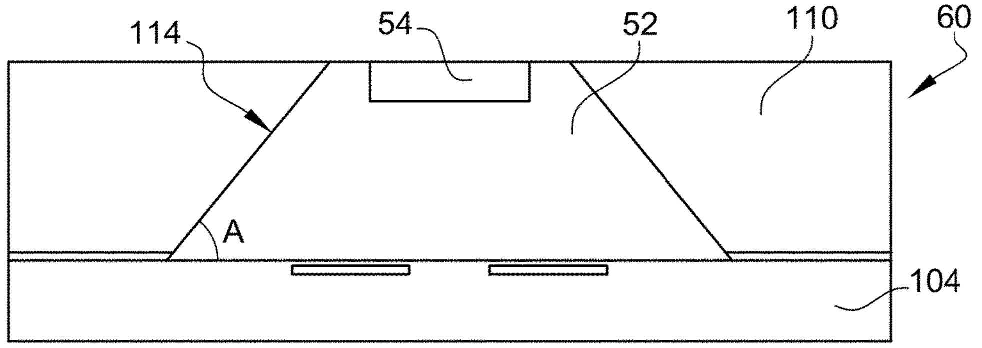
FIG. 7 is a cross-section view of a variant of the embodiment of FIGS. 6A and 6B

FIG. 7 is a cross-section view of a variant of the embodiment of FIGS. 6A and 6B.

The device 60 of FIG. 7 comprises elements of the device 50 of FIGS. 6A and 6B that will not be described again. The device 60 differs from the device 50 in that the flanks of the cavity 114 are not straight, but biased. In other words, the flanks of the cavity 114 form an angle A with the upper face of the substrate, in particular with the portion of the upper face of the substrate in contact with the material 52. The angle A is, for example, less than 90°, for example comprised between 30° and 60°. The upper face of the material 52 therefore has an area inferior to the area of the lower face of the material, in other words the face closest to the substrate.

An advantage of the embodiment of FIG. 7 is that the signals emitted by the antenna are channeled by the cavity 114.

Figure 8:
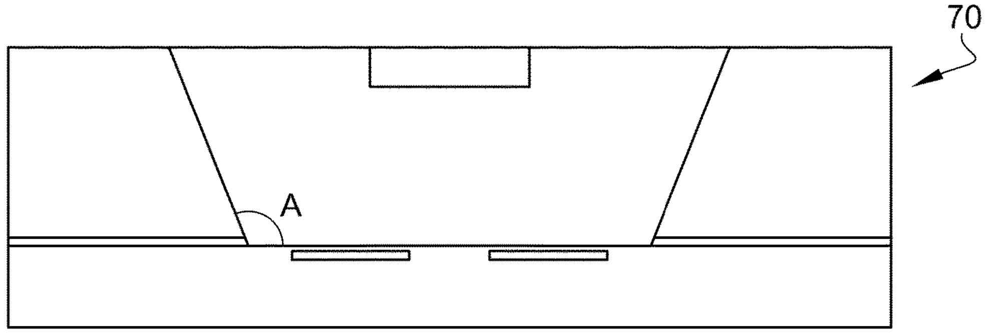
FIG. 8 is another cross-section view of a variant of the embodiment of FIGS. 6A and 6B.

FIG. 8 is another cross-section view of a variant of the embodiment of FIGS. 6A and 6B.

The device 70 of FIG. 8 comprises elements of the device 60 of FIG. 7 that will not be described again. The device 70 differs from the device 60 in that the angle A is preferably over 90°, for example comprised between 120° and 150°.

Therefore, the upper face of the material 52 has an area superior to the area of the lower face of the material, in other words the face closest to the substrate.

An advantage of the embodiment of FIG. 7 is that the signals emitted by the antenna are diffused by the cavity 114.

FIGS. 9A-9D represents top views of variants of the embodiment of FIGS. 6A and 6B. FIGS. 9A, 9B, 9C and 9D each represent a different form of the cavity 114.

Each of FIGS. 9A-9D represents the layer, 110, the edges of the cavity 14, the material 52 and the plate 54.

Figure 9A:
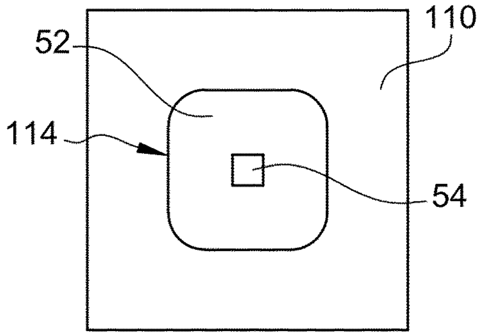
FIGS. 9A-9D represent top views of variants of the embodiment of FIGS. 6A and 6B.

In FIG. 9A, the edges of the cavity form, in the plane of the upper face of the layer 110, a rectangle with smoothed angles.

Figure 9B:
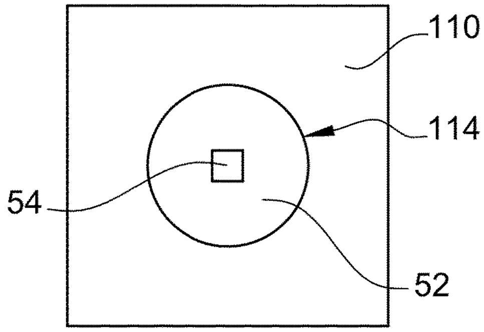

In FIG. 9B, the edges of the cavity form, in the plane of the upper face of the layer 110, a circle, or an oval.

Figure 9C:
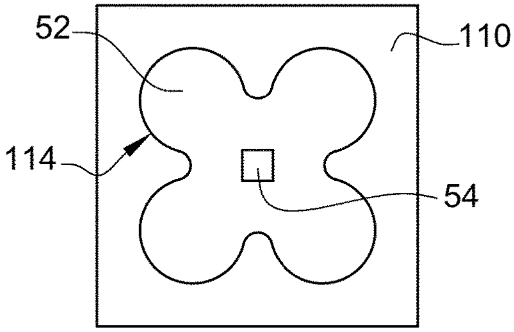

In FIG. 9C, the edges of the cavity form, in the plane of the upper face of the layer 110, a form comprising four circular elements overlapping partially. Each of the circular elements is, for example, in regard with a portion of the antenna 102 of the device.

Figure 9D:
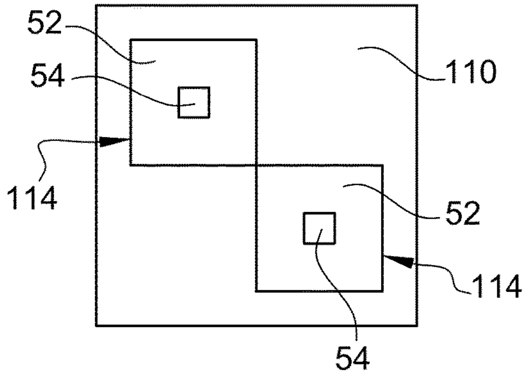

In FIG. 9D, the device comprises two cavities 114, each being in regard with an antenna. For example, one of the cavities is in regard with an antenna configured to receive signals, and the other cavity is for example in regard with an antenna configured to emit signals. In the example of FIG. 9D, the edges of the cavities form a rectangle. In other example, the edges of the cavities may have any other form, for example the forms described in relation with FIGS. 9A to 9C.

The embodiment of FIG. 9D is advantageous in that the cavities are separated by a portion of the layer 110 and are therefore isolated in regard to the signals emitted or received. In other words, the signals emitted or received in one of the cavities does not impact the signals emitted or received in the other cavity.

In some embodiments, the forms of the cavities 114, 214 of the embodiments described in relation with FIGS. 1A to 6B can have the form of the cavities 114 described in relation with the FIGS. 7 to 9D.

An advantage of the embodiments described in relation with FIGS. 6A to 9D is that the cavities 114, and therefore the material 52, can be made in numerous forms and in different height.

An advantage of the embodiments described in relation with FIGS. 6A to 9D is that this embodiment does not include the deposition of a plate, especially a plate in glass, and therefore does not face the risks of misalignment or of damage to the plate.

Various embodiments and variants have been described. Those skilled in the art will understand that certain features of these various embodiments and variants may be combined, and other variants will occur to those skilled in the art. In particular, although, in the described embodiments, each cavity is located opposite a single antenna 102, at least certain cavities may comprise more than one antenna opposite a same cavity.

Finally, the practical implementation of the described embodiments and variations is within the abilities of those skilled in the art based on the functional indications given hereabove.

The invention claimed is:

1. An electronic device, comprising:

a first layer comprising an antenna;

a second layer made of metal and extending over the first layer and comprising at least one laterally-closed cavity, said laterally-closed cavity being located vertically above the antenna;

a resin material filling said laterally-closed cavity;

wherein said resin material comprises a laser direct structuring material; and a conductive plate formed at an upper surface of the laser direct structuring material filling the laterally-closed cavity.

2. The device according to claim 1, wherein the upper surface of the laser direct structuring material filling the laterally-closed cavity includes a laser activated region, and wherein the conductive plate comprises a plating material at the laser activated region.

3. The device according to claim 1, wherein said second layer includes at least one hole separate from the laterally-closed cavity, and wherein the resin material extends over an upper surface of the second layer and includes a foot portion that extends into said at least one hole.

4. The device according to claim 3, wherein said at least one hole forms a via extending through the second layer.

5. The device according to claim 3, wherein said at least one hole extends perpendicular to an upper surface of the first layer.

6. The device according to claim 3, wherein said at least one hole extends non-perpendicular to an upper surface of the first layer.

7. The device according to claim 1, wherein a peripheral wall of the first layer is coplanar with a peripheral wall of the second layer.

8. The device according to claim 1, wherein a lateral wall of said at least one laterally-closed cavity forms an acute angle with respect to an upper surface of the first layer.

9. The device according to claim 1, wherein a lateral wall of said at least one laterally-closed cavity forms an obtuse angle with respect to an upper surface of the first layer.

10. The device according to claim 1, wherein the upper surface of the laser direct structuring material filling the laterally-closed cavity is coplanar with an upper surface of the second layer.

11. The device according to claim 1, wherein said second layer is bonded to said first layer by an adhesive layer.

12. A method of making an electronic device, comprising:

forming a first layer comprising an antenna;

forming a second layer made of metal and comprising at least one laterally-closed cavity;

mounting the second layer over the first layer with said laterally-closed cavity being located vertically above the antenna;

filling said laterally-closed cavity with a resin material;

wherein said resin material comprises a laser direct structuring material;

laser activating a region at an upper surface of the laser direct structuring material filling the laterally-closed cavity; and performing a plating process to produce a conductive plate at the laser activated region.

13. The method according to claim 12, further comprising forming at least one hole separate from the laterally-closed cavity in the second layer, and filling said at least one hole with the resin material.

14. The method according to claim 13, wherein said at least one hole extends perpendicular to an upper surface of the first layer.

15. The method according to claim 13, wherein said at least one hole extends non-perpendicular to an upper surface of the first layer.

16. The method according to claim 13, further comprising forming said at least one laterally-closed cavity with a lateral wall that forms an acute angle with respect to an upper surface of the first layer.

17. The method according to claim 13, further comprising forming said at least one laterally-closed cavity with a lateral wall that forms an obtuse angle with respect to an upper surface of the first layer.

18. The method according to claim 13, wherein mounting comprises bonding said second layer to said first layer using an adhesive layer.

* * * * *